(12) United States Patent
Williams et al.

(10) Patent No.: US 8,053,929 B2
(45) Date of Patent: Nov. 8, 2011

(54) SOLAR POWER ARRAY WITH MAXIMIZED PANEL POWER EXTRACTION

(75) Inventors: Bertrand Jeffery Williams, Austin, TX (US); Bret Allan Raymis, Austin, TX (US)

(73) Assignee: Solar Power Technologies, Inc., Austin, TX (US)

( * ) Notice: Subject to any disclaimer, the term of this patent is extended or adjusted under 35 U.S.C. 154(b) by 193 days.

(21) Appl. No.: 12/314,050

(22) Filed: Dec. 3, 2008

(65) Prior Publication Data
US 2010/0133911 A1  Jun. 3, 2010

(51) Int. Cl.
*H02J 1/00* (2006.01)
*H02J 3/00* (2006.01)

(52) U.S. Cl. ........................................................ 307/82

(58) Field of Classification Search .................... 307/82, 307/43, 71
See application file for complete search history.

(56) References Cited

U.S. PATENT DOCUMENTS

| 2007/0221267 A1 | 9/2007 | Fornage |
| 2009/0160258 A1* | 6/2009 | Allen et al. ..................... 307/82 |

OTHER PUBLICATIONS

Wikipedia, the free encyclopedia—Maximum power point tracker—http://en.wikipedia.orq/wiki/Maximum_power_point_tracker—downloaded Nov. 17, 2008.
otherpower.com, "New Solar Panels", http://www.otherpower.com/otherpower_solar_new.html—downloaded Nov. 17, 2008.
Siri, Kasemsan, et al., "Sequentially Controlled Distributed Solar-Array Power System with Maximum Power Tracking", IEEEAC paper #1001, Version 3, Updated Sep. 30, 2003.
Hong, Yan, et al., "Simple maximum power point tracker for photovoltaic arrays", Electronic Letters, vol. 36, No. 11, May 25, 2000.
What is MPPT? Explanation of maximum power point traking, http://www.wholesalesolar.com/Windy/MPPT-article.html—downloaded Nov. 17, 2008.
Woodward, W. Stephen, "Maximum-Power-Point-Tracking Solar Battery Charger", University of North Carolina, Electronic Design, Sep. 14, 1998.
Siri, Kasemsan, et al., "Parallel-Connected Converters with Maximum Power Tracking," The Aerospace Corporation, Electrical and Electronic Systems Department, Seventeenth Annual IEEE Applied Power Electronics Conference and Exposition, Mar. 10-14, 2002, 7 pages.
Leonor Linares, et al., "Improved Energy Capture in Series String Photovoltaics via Smart Distributed Power Electronics," Twenty-Fourth Annual IEEE Applied Power Electronics Conference and Exposition, 2009, 7 pages.
G.R. Walker, J. Xue and P. Sernia, "PV String Per-Module Maximum Power Point Enabling Converters," The Australasian Universities Power Engineering Conference, 2003, 6 pages.
Walker, G.R. and Pierce, J.C., "PhotoVoltaic DC-DC Module Integrated Converter for Novel Cascaded and Bypass Grid Connection Topologies—Design and Optimisation," 37th IEEE Power Electronics Specialists Conference, 2006, 7 pages.

* cited by examiner

*Primary Examiner* — Jared Fureman
*Assistant Examiner* — Carlos Amaya

(57) ABSTRACT

A solar power array includes solar power panels, where each solar panel provides output current and voltage, separate DC-DC converters, where each solar panel is connected to a unique DC-DC converter, where each DC-DC converter is designed to maximize the power from each solar panel, and where each DC-DC converter produces a high voltage output, a high voltage DC bus coupled to the DC-DC converters that receives the high voltage output, and a DC-AC inverter that inverts the high voltage DC on the high voltage DC bus to an AC power signal for distribution to one or more AC loads.

23 Claims, 6 Drawing Sheets

SOLAR POWER ARRAY WITH MAXIMIZED PANEL POWER EXTRACTION

BACKGROUND

Solar energy arrays convert sunlight incident on individual panels of the array into electrical energy. The normal means for converting the solar energy into electrical energy is photovoltaic conversion. The electrical energy output from this photovoltaic conversion is direct current (DC). The DC electrical energy may then be converted to alternating current electrical energy by means of an inverter. The basic systems and methods for collecting solar energy, generating DC electrical energy, and inverting the DC to AC electrical energy are well known to those skilled in the art. However, the basic systems and methods often suffer from inefficiencies, particularly when applied in a large scale operation, such as supply power to a grid from a utility, commercial, or industrial power plant (above 100 kW power levels), as opposed to a small scale operation, such as supply power to a single residential house (around 3 kW). Hence, power engineers are constantly striving to improve efficiency of collection and conversion.

SUMMARY

What is disclosed is a solar power array that includes a multiplicity of solar power panels, where each solar panel provides output current and voltage, separate DC-DC converters, where each solar panel is connected to a unique DC-DC converter, and where each DC-DC converter produces a high voltage output, a high voltage DC bus coupled to the DC-DC converters that receives the high voltage output, and a DC-AC inverter that inverts the high voltage DC on the high voltage DC bus to an AC power signal for distribution to one or more AC loads.

DESCRIPTION OF THE DRAWINGS

The detailed description will refer to the following drawings in which like numerals refer to like items, and in which.

DETAILED DESCRIPTION

Solar energy arrays convert sunlight incident on individual panels of the array into electrical energy. The normal means for converting the solar energy into electrical energy is photovoltaic conversion. The electrical energy output from this photovoltaic conversion is direct current (DC). The DC electrical energy then may be converted to alternating energy by means of an inverter. The basic systems and methods for collecting solar energy, generating DC electrical energy, and inverting the DC to AC electrical energy are well known to those skilled in the art. However, the basic systems and methods often suffer from inefficiencies, particularly when applied in a large scale operation, such as supplying power to a grid from a utility, commercial, or industrial power plant (above 100 kW power levels), as opposed to a small scale operation, such as supplying power to a single residential house (around 3 kW). Hence, power engineers are constantly striving to improve efficiency of collection and conversion.

More specifically, prior art solar power arrays typically have been built around a power delivery system that uses a high DC voltage bus at around 300-600 volts. High voltages approaching 600V, or even as much as 1000V, on the output bus (DC) allow for lower operating currents, and thus lower copper wiring losses, for a specified delivered power level in a large utility scale array. However, the individual solar panels which comprise the solar power array typically are built to deliver only between 50-150 volts, with some newer designs approaching a couple hundred volts. Thus, to achieve the desirable high voltage, the prior art solar power arrays consist of series-connected solar panels. The drawback with this arrangement is that in a series-connected circuit, the circuit element with the lowest delivered current level essentially limits the output current for the entire circuit to that individual element's current level. Put another way, the solar panel with the lowest output current will limit overall output current.

Figure 1:
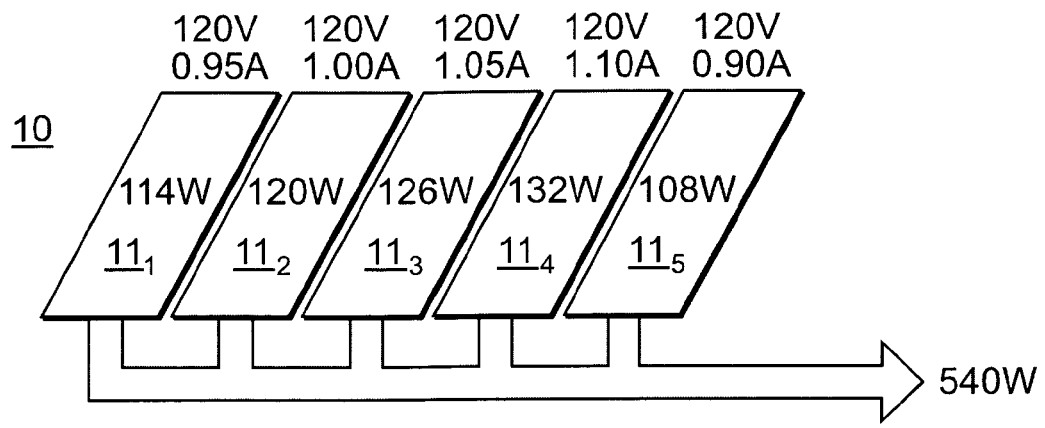
FIG. 1 illustrates a typical prior art solar power string.

FIG. 1 illustrates a prior art, series-connected solar power string 10 in which solar panels 11 are series-connected to provide a nominal, or hoped for, 600 watts based on a bus voltage of 600 volts nominal and 1.0 amps nominal. However, solar panel $11_5$ produces an output current of only 0.9 amps. Thus, using a simplified analysis, the actual output power is 600V×0.9A=540 watts, or an unrecovered potential power, in effect a power loss ($P_{loss}$), of 10 percent.

Figure 2:
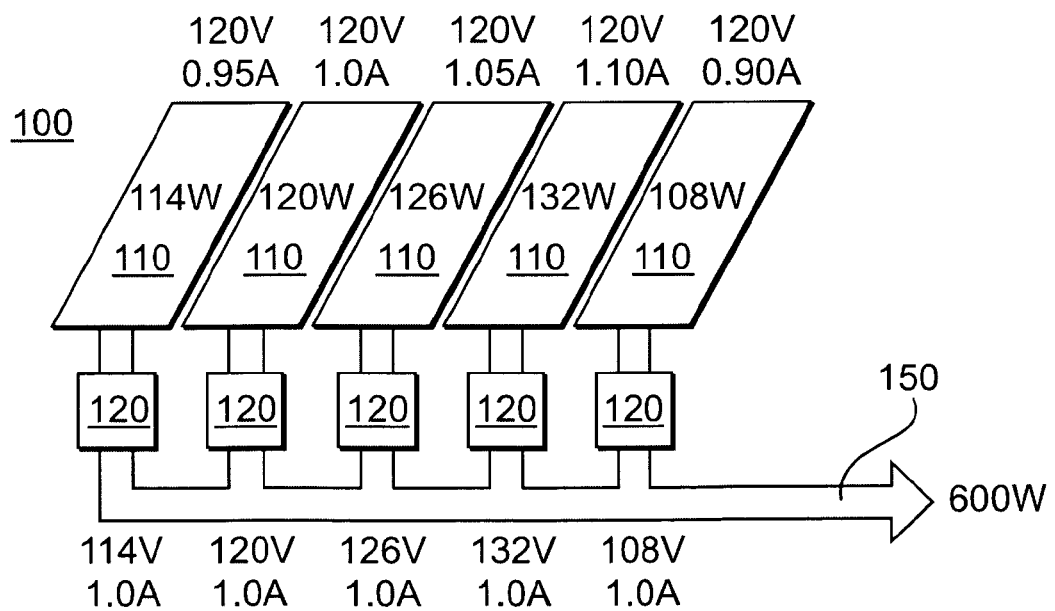
FIG. 2 is a block diagram of elements of an exemplary solar power string designed to improve efficiency of power conversion.

FIG. 2 is a block diagram of elements of an exemplary solar power array designed to improve efficiency of power conversion in a high-voltage bus application. In FIG. 2, solar power string 100 includes solar panels 110 coupled through series connected DC-DC converters 120 to an output bus 150. In an embodiment, each solar panel 110 generates a nominal 120 volts DC at 1 amp, for a power output of 120 watts. With the configuration shown in FIG. 2, the solar string 100 generates 600 volts DC at 1 amp, for 600 watts of power. That is, each solar panel 110 produces 120 volts DC, and when coupled in the manner shown in FIG. 2, the solar panels 110 combine to provide a nominal 600 volts DC and current of 1 amp. One of ordinary skill in the art will recognize that in a solar power array providing power to a grid, many solar power strings 100 would be combined to provide the desired power output.

Because of many factors, including manufacturing tolerance, degradation over time, and operating conditions, some or all of the solar panels 110 may deviate from the nominal values of voltage and current. To compensate for these variations in current and voltage, the DC-DC converters 120 incorporate a maximum power tracking controller, described below with reference to FIGS. 4A and 4B, so that as outputs from individual panels 110 vary, the overall effect on the solar power string 100 is eliminated, or at least minimized, by extraction of the maximum power from each panel and removal of the weak panel limitation with the series connection. In addition to maximum power tracking, the DC-DC converters 120 also may function to step up the DC voltage from that supplied by the individual solar panels 110 (120 volts DC) to a higher voltage so as to achieve the voltage desired on the DC bus.

Figure 3:
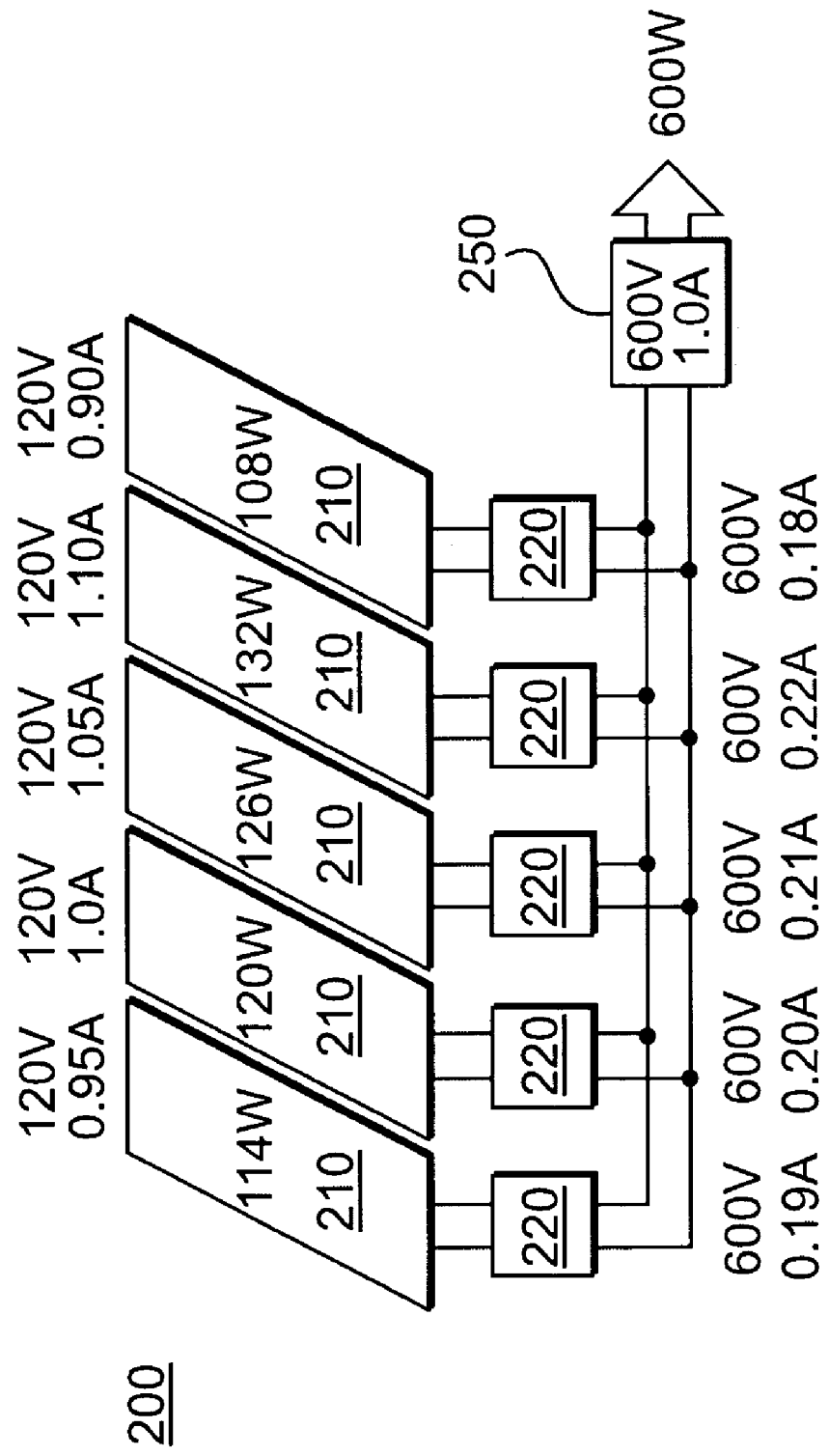
FIG. 3 is a block diagram of elements of an alternate, exemplary solar power string having improved power conversion efficiency.

FIG. 3 is a block diagram of elements of an alternate, exemplary solar power string having improved power conversion efficiency. In FIG. 3, solar power string 200 includes solar panels 210 coupled through parallel-connected DC-DC converters 220 to output bus 250. Similar to the solar power string 100, the solar power string 200 incorporates maximum power tracking features and output DC-DC voltage step up and current regulation features. The features are incorporated in the DC-DC converters 220, which operate to ensure that all power available in the solar power string 200 is recovered. Each of the solar panels 210 operates at a nominal 120 volts DC and 1 amp. With five such solar panels 210, the output voltage is 600 volts DC, and the corresponding output power is 600 watts. Since these panel-converter combinations are parallel-connected, the number of these combinations in a string is not set by the output bus voltage, but rather by how much current delivery is desired per string. Each DC-DC converter 220 in each panel string 200 directly boosts the solar panel output voltage to the desired bus voltage. The converter 220 is designed to adapt its output to variations in the bus voltage by managing the operating conditions of only its associated solar panel. As with the series connected converters 120 shown in FIG. 2, this control architecture effectively provides for "virtual power port" operation on the converter outputs. The concept of virtual power port operation will be described in more detail later.

Figure 4A:
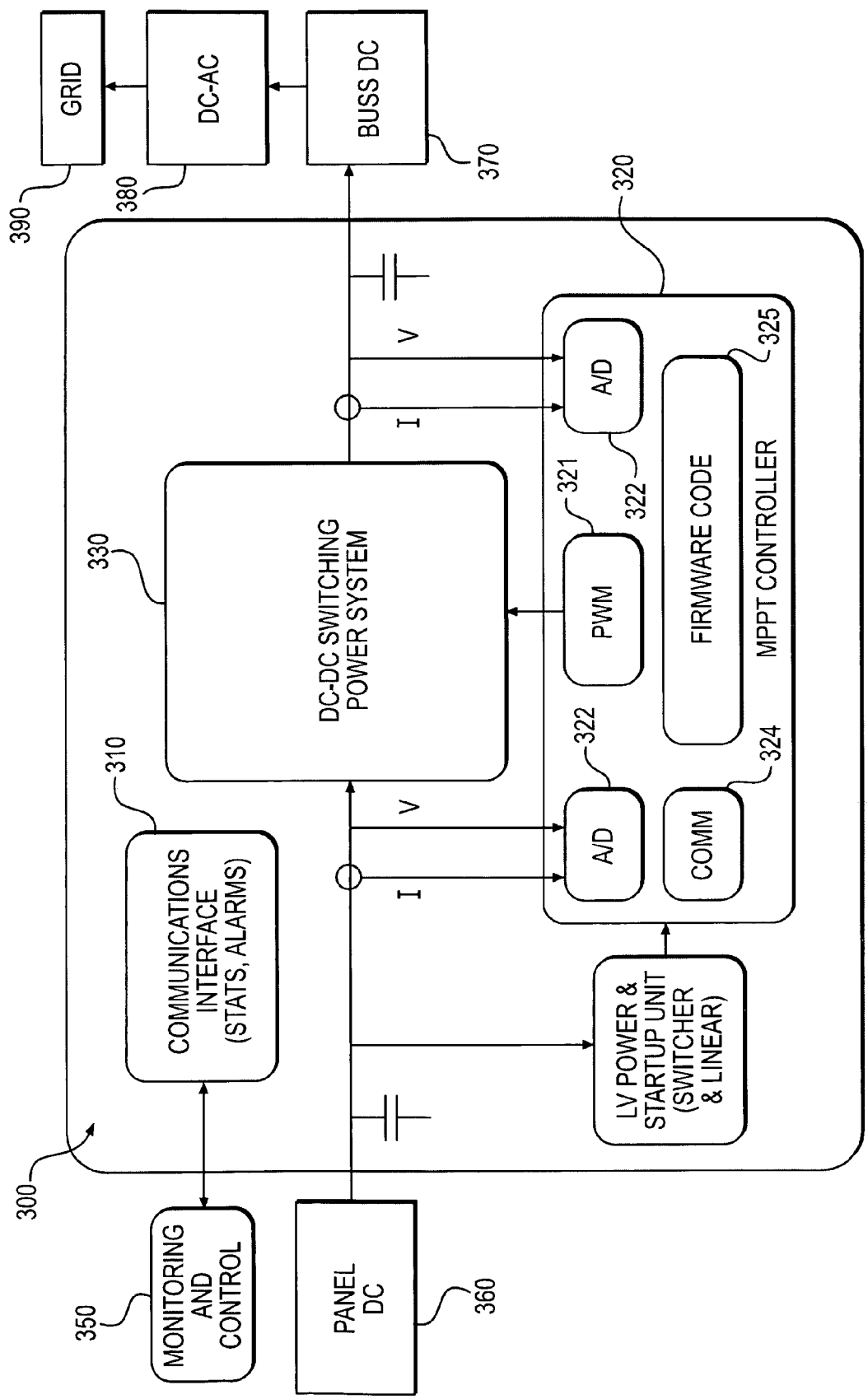
FIG. 4A illustrates selected components of an exemplary power converter used with either of the solar power strings shown in FIGS. 2 and 3.

FIG. 4A is a block diagram of an exemplary DC-DC converter 300 that may be used with the solar power strings 100 or 200 of FIGS. 2 and 3, respectively. In FIG. 4A, DC-DC converter 300 adapts the power delivery characteristics of its associated solar panel such that the maximum power the solar panel can deliver is adapted to the array architecture so that all possible power can be recovered. That is, the DC-DC converter 300 controls the output of its associated solar panel so that AC power out of the overall solar power array is optimally matched to the power requirements of the attached power grid. The DC-DC converter 300 includes communications interface 310, MPPT controller 320, DC-DC switching power system 330, low voltage (LV) and startup unit 340, and remote monitoring and control routines 350. The converter 300 is shown connected to solar panel 360 and to high voltage DC bus 370. The high voltage DC bus 370, in turn, is connected to DC-AC inverter 380 to convert the high voltage DC to AC, which then is supplied to power grid 390.

The communications interface 310 may be used in support of the MPPT controller 320 to communicate with, and monitor, the status of internal elements of the converter 300 and related circuitry, and to communicate with and monitor the associated solar panel. In particular, the communications interface 310 may use monitoring and control routines 350 to track the operating conditions of the solar panel, and exchange this information with MPPT controller 320.

The LV and startup unit 340 controls operation of the MPPT controller 320 and its associated solar panel upon "startup" of the solar array (where startup refers to a situation in which a solar panel first starts making power—generating DC electricity—such as upon sunrise). In these startup situations, solar panel DC voltage goes from zero volts DC when no light is incident on the solar panel to the panel's nominal voltage (e.g., 120 V DC), and the LV and startup unit 340, combined with algorithms in the firmware code 325, provides a "soft start" feature for both the solar panel and the connected DC-DC converter to minimize large power transients.

The MPPT controller 320 is provided with voltage and current data from the communications interface 310, and uses these data to control the power out of the solar panel so as to provide the maximum electrical power available from that solar panel. The MPPT controller 320 includes routines 325 that compare the monitored information provided by the communications interface 310, and associated sensors, against a power maximizing algorithm to determine what corrections, if any, should be made to the solar panel's operating point on the curve to achieve the maximum output power. For example, in cold weather, the solar panel typically will generate more power than during hot weather. Thus, a standard 120 watt solar panel may generate 130 watts of power or more under cold conditions, the 120 watt power rating in this case being determined under standard test conditions with ambient temperature set at perhaps 70° F. These routines may be implemented in software, hardware, firmware (as shown), or in any combination thereof. The MPPT controller 320, is designed to monitor the variance in power over the operating point range for the solar panel, by both monitoring perturbations in the voltage and current operating points to determine the optimal correction for maximum power, and may include monitoring of the derivative of the calculated power curve verses voltage or current. By thus adapting the solar panel's operating conditions to the solar panel's power curve, the MPPT controller 320 can cause the solar panel can be operated to provide a maximum power output.

The MPPT controller 320 further includes A/D units, 322, PWM unit 321, and COMM unit 324. The A/D units 322 convert analog values of voltage and current into digital signals that can be processed using the routines 325. The PWM unit 321 generates the pulse-width modulated signal the drives the DC-DC switching power system 330. The COMM unit 324 generates the communications signals associated with monitoring and control of the system.

The DC-DC switching power system 330 receives the DC output from the solar panel 360, and changes the DC output to a pulsed DC power signal, which is filtered and fed to the DC-DC converter output, thus creating a "virtual power port". Since only the input variables of the DC-DC converter 300 are directly managed, based upon the solar panel's maximum power point (MPP—see FIGS. 6A and 6B), the DC-DC converter 300 acts as a power transferring element where the output power is approximately equal to the input power (minus losses), and the output voltage and current operating points will dynamically adapt to load conditions. This "virtual output power port" style of operation allows the output of the DC-DC converter 300 to dynamically operate in either an equivalent of constant current or constant voltage mode. The thus-processed DC output is provided to the high voltage DC bus 370.

Operation of the DC-DC converter 300 is dynamic in that the conditions (e.g., I, V) of the solar panel are monitored constantly, or frequently, and the power transfer functions that are used with the MPPT controller 320 to determine output power from the converter 300 are adjusted to maintain the desired solar panel output power. Algorithms within the firmware code 325 may incorporate optimization for MPP operating point jitter and accelerated acquisition.

Figure 4B:
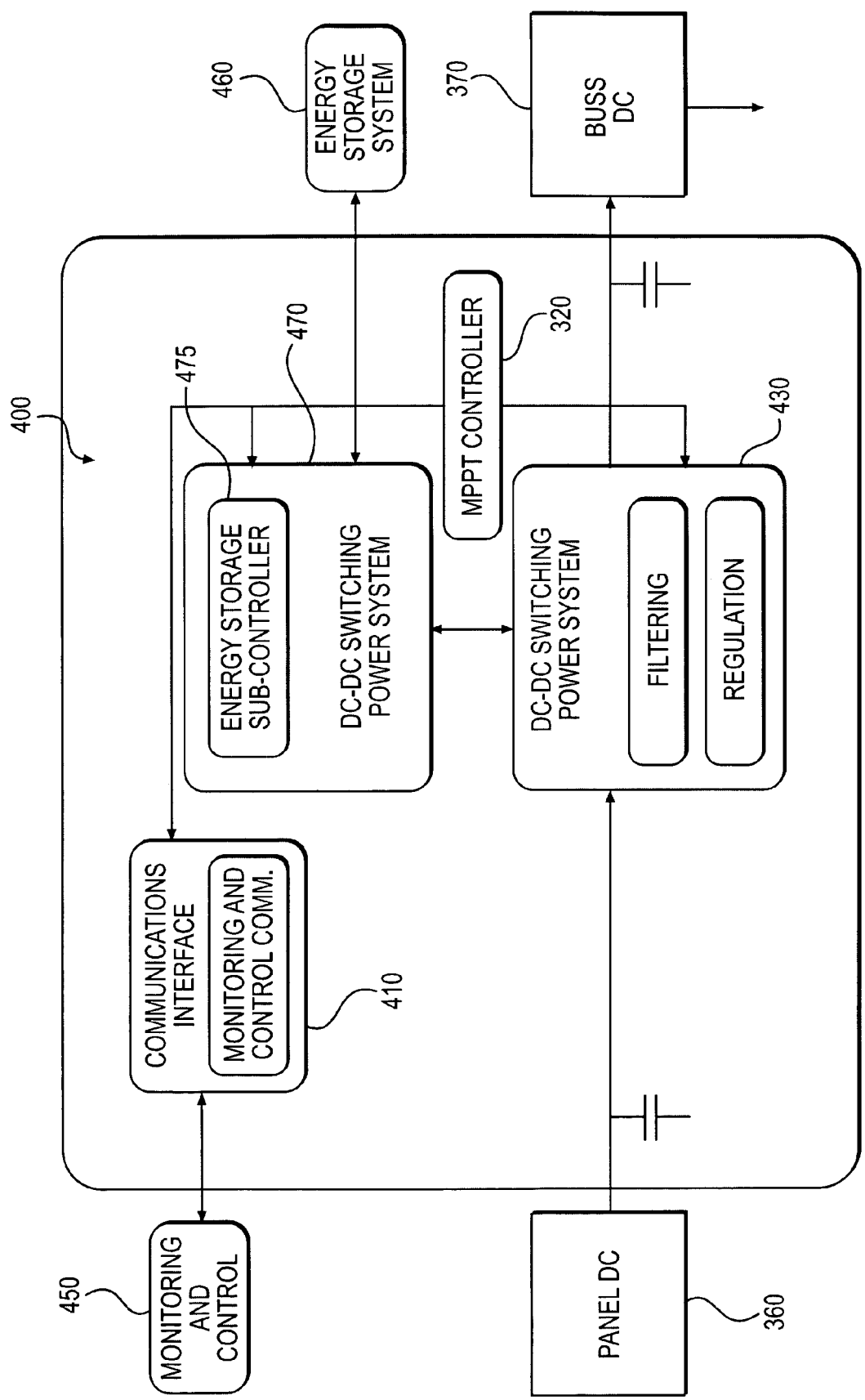
FIG. 4B illustrates an alternative exemplary power converter.

FIG. 4B illustrates selected components of an alternative, exemplary DC-DC converter 400. The DC-DC converter 400 is coupled to a solar panel 360 at its input and to high voltage DC bus 370 at its output. The DC-DC converter 400 uses remote monitoring and control routines 450 to monitor operation of the solar panel 360. The routines 450 provide data to communications interface 410. MPPT controller 320 communicates with DC-DC switching power system 430 for supplying DC power to the grid. In addition, the MPPT controller 320 communicates with DC-DC switching system 470 to provide DC power to energy storage system 460. The energy storage system 460 stores excess electrical power produced by the solar array. The energy storage system 460 may be any system capable of storing electrical power, including, for example, a storage battery or high density capacitor element.

The DC-DC switching system 470 includes energy storage sub-controller 475. The energy storage sub-controller 475 includes hardware components and power transfer and other software routines that enable the converter 400 to monitor peak power delivery times and to leak off some portion of the power to the energy storage system 460 for use at a later time when power demand increases or when power delivery capacity is reduced, such as during periods of reduced solar energy (e.g., storms, cloud cover, night time). The power transfer routines also allow the grid to supply power to the solar array for storage. These storage-to-bus or bus-to-storage power transfer routines may incorporate instructions sent to the controller 475 via the communications controller interface 410, as determined by a solar array power plant operator.

Figure 5:
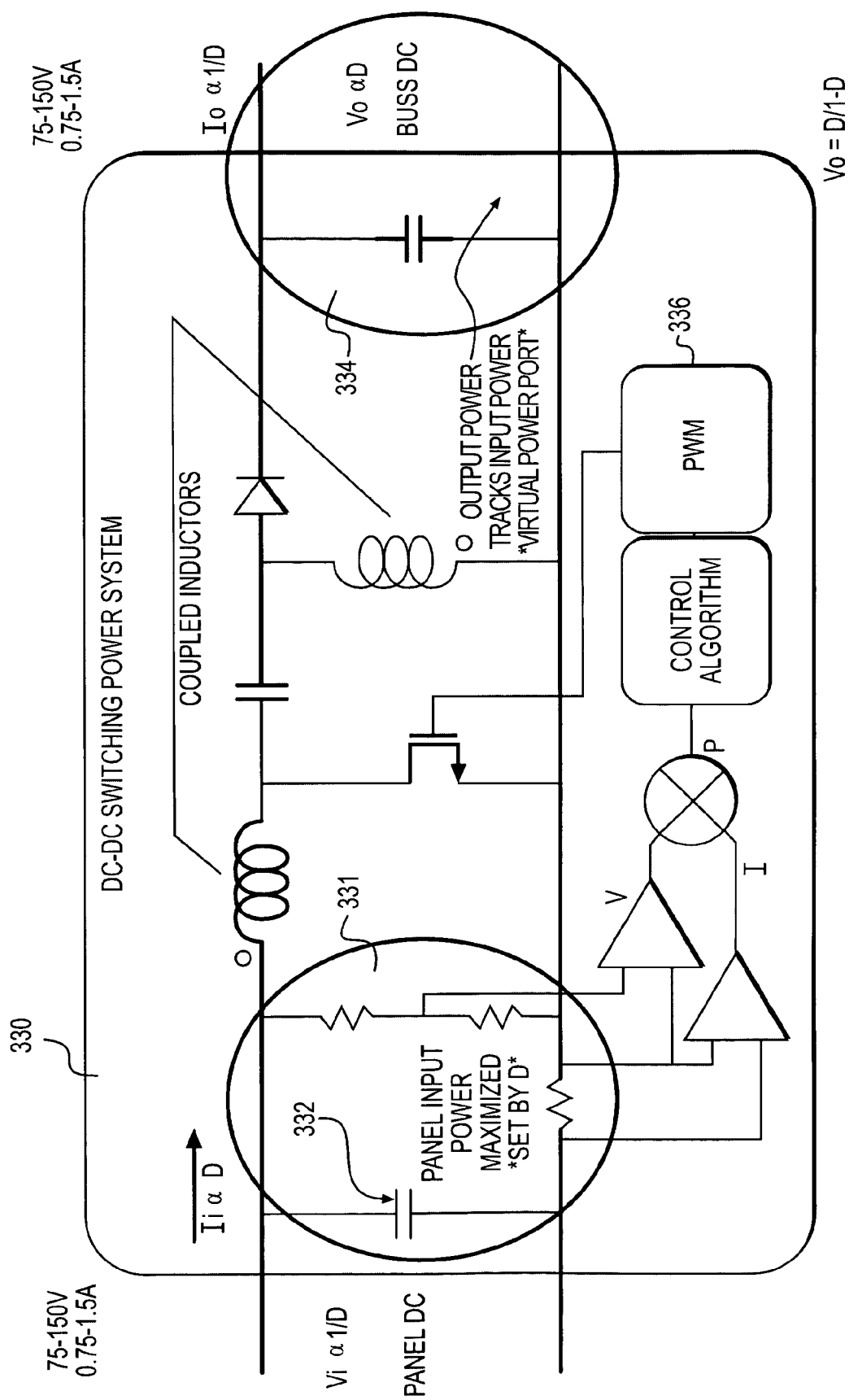
FIG. 5 illustrates selected details of the power converters of FIGS. 4A and 4B.

To provide the above-described maximum power tracking functionality, the DC-DC switching system 330 of FIG. 4A (and the switching system 430 of FIG. 4B), as shown in FIG. 5, comprises a modified current-mode switching converter power stage 331 with a built-in input filter 332, and output voltage and current boundary condition regulation control circuit 334. The current-mode switching converter power stage 331 may operate under control of a pulse-width modulation (PWM) controlled converter 336, or other similar form of pulsed switching stage. Examples include a buck (step-down), boost (step up), or a buck-boost (step up or down), SEPIC (single ended primary inductor converter)(step up or down), active clamped forward (step up or down), or other architecture style converter. The input-filter 332 provides a means for smoothing the input current drawn from the solar panel such that the solar panel operating point, in steady state, is nearly quiescent. The output bus boundary condition control circuit 334 is used to maintain reasonable operating boundary conditions on the output port of the DC-DC converters 300/400, thus ensuring overall system stability during power point tracking operations.

Figure 6B:
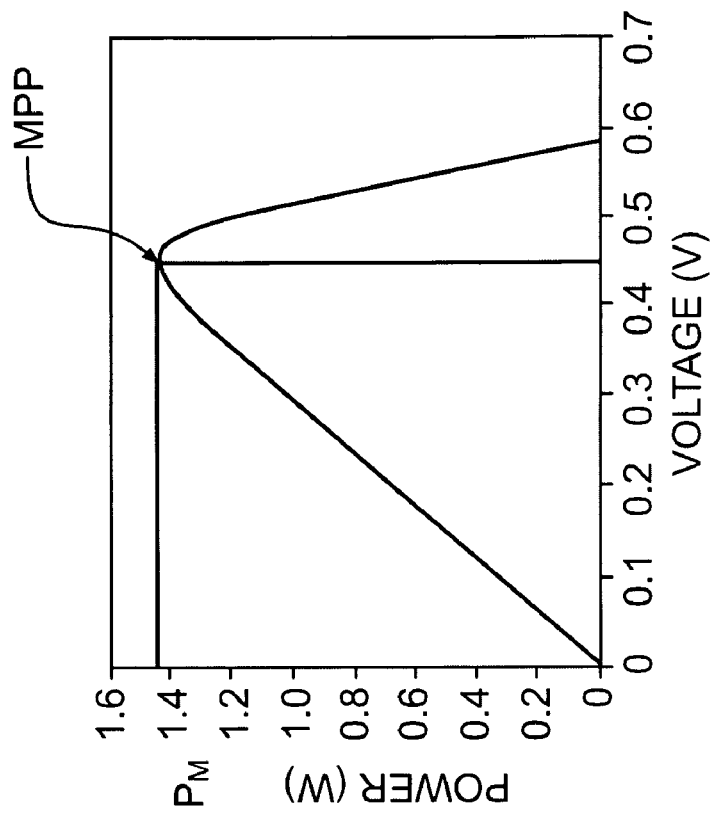
FIGS. 6A and 6B illustrate, respectively, a current-voltage curve, and a calculated power curve, for a solar panel used with either of the solar power strings shown in FIGS. 2 and 3.
Figure 6A:
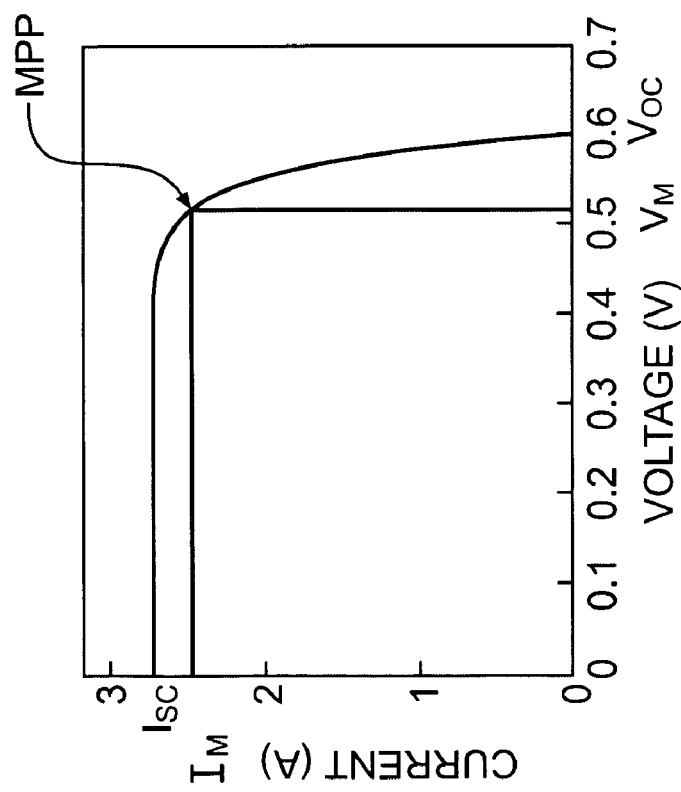

FIG. 6A illustrates a typical I-V curve for a solar panel. Any photovoltaic (PV) solar panel will have, for a given set of ambient conditions (such as illumination, temperature, radiation dose, and aging effects), a single operating point where the values of current (I) and voltage (V) of the cell result in a maximum power output. A PV solar panel has an exponential relationship between current and voltage, and the maximum power point (MPP) occurs at the knee of an I-V curve expressing that relationship, where maximum power is delivered when the load resistance is equal to the source resistance R (where R=V/I) and the derivative of the calculated Power is zero with respect to voltage and current (dP/dI=dP/dI=0).

FIG. 6B illustrates a calculated power versus voltage curve to the solar panel referenced with respect to FIG. 6B. As can be seen, power out of the solar panel increases essentially linearly until the maximum power point (MPP) is reached, and then drops with increasing voltage. Ideally, the solar panel would be caused to operate near the MPP.

The invention claimed is:

1. A solar power array, comprising:
   a plurality of solar power panels, wherein each solar panel provides output current and voltage;
   a high-voltage DC bus configured to propagate a high DC voltage;
   a plurality of separate DC-DC converters, wherein each solar panel is connected to a unique DC-DC converter of the separate DC-DC converters, wherein each unique DC-DC converter comprises:
   a first DC-DC switching power module having an output coupled to the high-voltage DC bus, and configured to produce the high DC voltage at its output to provide the high DC voltage to the high-voltage DC bus; and
   a second DC-DC switching power module configured to communicate with the first DC-DC switching power module to provide DC power to an external energy storage system; and
   a DC-AC inverter that inverts the high DC voltage output propagated by the high-voltage DC bus to an AC power signal for distribution to one or more AC loads.

2. The solar power array of claim 1, wherein each DC-DC converter further comprises:
   a sensing circuit configured to sense current and voltage output of an associated solar panel; and
   a maximum power point tracking (MPPT) controller, coupled to the sensing circuit and configured to receive the sensed current and voltage output of the associated solar panel, and calculate power being delivered by the associated solar panel to determine adjustments to be made to the associated solar panel's operating conditions;
   wherein the first DC-DC switching power module is coupled to the MPPT controller, and configured to receive the determined adjustments and transfer the power to the high-voltage DC bus to achieve a maximum power output from the associated solar panel.

3. The solar power array of claim 1, wherein a respective output port of the first DC-DC switching power module of at least one of the separate DC-DC converters comprises a current equalizing circuit providing an effective virtual power port to ensure that the at least one of the separate DC-DC converters operates in an equivalent of an output voltage mode.

4. The solar power array of claim 3, wherein a respective high DC voltage output of the first DC-DC switching power module of the at least one of the separate DC-DC converters is dynamically maintained within optimal boundary conditions.

5. The solar power array of claim 1, wherein the first DC-DC switching power module comprises a single-ended primary-inductor converter (SEPIC) circuit architecture to transfer power to its output.

6. The solar power array of claim 1, wherein the first DC-DC switching power module comprises an active clamped forward circuit architecture to transfer power to its output.

7. The solar power array of claim 1, wherein respective output voltages and currents of the separate DC-DC converters are dynamically maintained within optimal boundary conditions.

8. The solar power array of claim 1, wherein the first DC-DC switching power module of at least one of the separate DC-DC converters comprises a switching power supply boost circuit to transfer power to its output.

9. The solar power array of claim 1, wherein the first DC-DC switching power module of at least one of the separate DC-DC converters comprises a switching power supply active clamp forward circuit to transfer power to its output.

10. The solar power array of claim 1, wherein the DC-DC converter further comprises an energy storage controller configured to control the second DC-DC switching power module for transferring output power to and from the external storage module in response to power availability from the solar panels and demand from the high-voltage DC bus.

11. A system configured to couple to a plurality of solar panels, the system comprising:

a high-voltage DC bus configured to propagate a high DC voltage;

a plurality of separate DC-DC converters, wherein each respective DC-DC converter is configured to couple to a respective solar panel of the plurality of solar panels to receive an output from the respective solar panel, wherein each DC-DC converter comprises:

a first DC-DC switching power module having an output coupled to the high-voltage DC bus, and configured to produce the high DC voltage at its output to provide the high DC voltage to the high-voltage DC bus; and a second DC-DC switching power module configured to communicate with the first DC-DC switching power module to provide DC power to an external energy storage system; and a DC-AC inverter that inverts the high DC voltage output propagated by the high voltage DC bus to an AC power signal for distribution to one or more AC loads.

12. The system of claim 11, wherein each DC-DC converter further comprises:

a sensing circuit to sense current and voltage output of an associated solar panel;

a maximum power point tracking (MPPT) controller, coupled to the sensing circuit and configured to receive the sensed current and voltage output of the associated solar panel, and calculate power being delivered by the associated solar panel to determine adjustments to be made to the associated solar panel's operating conditions;

wherein the first DC-DC switching power module is coupled to the MPPT controller, and configured to receive the determined adjustments and transfer the power to the high-voltage DC bus to achieve a maximum power output from the associated solar panel.

13. The system of claim 11, wherein a respective output port of the first DC-DC switching power module of at least one of the separate DC-DC converters comprises a current equalizing circuit providing an effective virtual power port to ensure that the at least one of the separate DC-DC converters operates in an equivalent of an output voltage mode.

14. The system of claim 13, wherein a respective high DC voltage output of the first DC-DC switching power module of the at least one of the separate DC-DC converters is dynamically maintained within optimal boundary conditions.

15. The system of claim 11, wherein the first DC-DC switching power module of each DC-DC converter comprises a single-ended primary-inductor converter (SEPIC) circuit architecture to transfer power to the output of the first DC-DC switching power module.

16. A power converter configured to couple to a solar panel, the power converter comprising:

a sensing circuit configured to sense current and voltage output of the solar panel;

a first converter circuit coupled to the sensing circuit and configured to produce a high DC voltage based on the sensed current and voltage output of the solar panel;

a control circuit configured to control the high DC voltage;

a first output port configured to provide the high DC voltage;

a second converter circuit configured to communicate with the first converter circuit to generate a second DC voltage; and a second output port configured to provide power to an external energy storage system based on the second DC voltage;

wherein the control circuit comprises a current equalizing circuit constituting an effective virtual power port that ensures that the power converter operates in an equivalent of an output voltage mode.

17. The power converter of claim 16, wherein the current equalizing circuit is configured to dynamically maintain the high DC voltage of the power converter within optimal boundary conditions.

18. The power converter of claim 16,
wherein the first converter circuit comprises a switching power supply having a single-ended primary-inductor converter (SEPIC) circuit architecture to transfer power to the first output port.

19. The power converter of claim 16,
wherein the first converter circuit comprises a switching power supply active clamped forward circuit architecture to transfer power to the first output port.

20. The power converter of claim 16,
wherein the first converter circuit comprises a switching power supply boost circuit to transfer power to the first output port.

21. The power converter of claim 16,
wherein the first output port is configured to couple to a high-voltage output bus;
wherein the power converter further comprises:
an energy storage controller configured to control the second converter circuit for transferring output power to and from the external storage module in response to power availability from the solar panel and demand from the high-voltage output bus.

22. The power converter of claim 16, wherein the control circuit comprises a maximum power point tracking (MPPT) controller, coupled to the sensing circuit and configured to receive the sensed current and voltage output of the solar panel, and calculate power being delivered by the solar panel to determine adjustments to be made to the solar panel's operating conditions;

wherein the first converter circuit is configured to receive the determined adjustments and transfer power to the first output port according to the determined adjustments to achieve a maximum power output from the solar panel.

23. The power converter of claim 16, wherein the control circuit comprises a maximum power point tracking (MPPT) controller, coupled to the sensing circuit and configured to receive the sensed current and voltage output of the solar panel, and calculate power being delivered by the solar panel to determine adjustments to be made to the solar panel's operating conditions;

wherein the second converter circuit is configured to receive the determined adjustments and transfer power to the external energy storage system based on the second DC voltage and according to the determined adjustments to achieve a maximum power output from the solar panel.

* * * * *